United States Patent [19]

Tarbox

[11] Patent Number: 5,705,798
[45] Date of Patent: Jan. 6, 1998

[54] SYSTEM AND METHOD FOR PROCESSING A CUSTOMIZED FINANCIAL TRANSACTION CARD

[75] Inventor: Andrew W. Tarbox, Troy, N.Y.

[73] Assignee: MasterCard International Inc., N.Y.

[21] Appl. No.: 358,198

[22] Filed: Dec. 16, 1994

[51] Int. Cl.⁶ .................................................. G06F 15/30
[52] U.S. Cl. ........................ 235/379; 235/380; 364/408
[58] Field of Search ........................ 364/408; 235/379, 235/380, 487, 492

[56] References Cited

U.S. PATENT DOCUMENTS

| | | | |
|---|---|---|---|
| 4,454,414 | 6/1984 | Benton | 235/379 |
| 4,506,346 | 3/1985 | Bennett et al. | 364/900 |
| 4,709,137 | 11/1987 | Yoshida . | |
| 4,727,244 | 2/1988 | Nakano et al. | 235/380 |
| 4,827,512 | 5/1989 | Hirokawa et al. | 235/38 X |
| 4,859,837 | 8/1989 | Halpern | 235/380 |
| 4,868,373 | 9/1989 | Opheij et al. | 235/380 |
| 5,093,862 | 3/1992 | Scwartz | 235/380 X |
| 5,140,517 | 8/1992 | Nagata et al. | 235/380 |
| 5,157,247 | 10/1992 | Takahira | 235/492 |
| 5,212,369 | 5/1993 | Karlisbch | 235/379 |
| 5,225,667 | 7/1993 | Furuta et al. | 235/492 |

FOREIGN PATENT DOCUMENTS

| | | |
|---|---|---|
| 0159651 | 10/1985 | European Pat. Off. . |
| 0446081 | 9/1991 | European Pat. Off. . |
| 9116691 | 10/1991 | WIPO .............. G07F 7/10 |

*Primary Examiner*—Donald T. Hajec
*Assistant Examiner*—Karl Frech
*Attorney, Agent, or Firm*—Brumbaugh, Graves, Donohue & Raymond

[57] ABSTRACT

The present invention provides for a system and method of performing financial transactions which include a financial card that stores pre-selected transaction instructions corresponding to one or more financial transactions, such as cash withdrawal, or bill payment, or the like. These cards are used with one or more terminals which read the instructions on the card, interpret those instructions and execute the interpreted instructions to conduct one or more of said financial transactions. Preferably, the terminal—after determining from the instructions on the card what functions, i.e., financial transactions, are available to the card user—displays those options. The user then selects one of the financial transactions; the terminal based on the selection and the instructions corresponding to the selected function, executes the transaction.

22 Claims, 6 Drawing Sheets

SYSTEM AND METHOD FOR PROCESSING A CUSTOMIZED FINANCIAL TRANSACTION CARD

TECHNICAL FIELD

The present invention relates to a commercial transaction system and method and particularly to a system and method for conducting commercial transactions using financial cards.

BACKGROUND OF THE INVENTION

The present system of conducting financial transactions (i.e., those which involve a transfer or exchange of value or are of a commercial nature) utilizes transaction terminals that run predefined programs stored in the terminal to complete a transaction or transactions when a financial card is placed in the terminal. One example of a transaction terminal is an automatic teller machine (ATM). When a customer uses an automatic teller machine, the ATM accepts the customer's card when placed in a designated receptacle and executes a stored resident transaction program which interacts with the customer and performs selected functions. The program typically allows the customer to select a desired service to be performed and/or an amount to be deposited or withdrawn by interacting with a touch-sensitive screen or external buttons. The resident program in the terminal must be updated periodically to introduce new features or services offered to the customer or requested by the issuer.

Terminal resident transaction programs for financial transactions create a number of inconveniences. Individual financial institutions such as banks each issue their own financial cards and have their own programs which may only support features offered by their own banks. A specialized feature of one bank, such as a bonus program for usage, would not be supported by the transaction program in the terminal of another bank. To insure that an issued card can be used at any terminal, each terminal has to be provided with each issuer bank's transaction programs.

Moreover, many of the terminals have different and diverse transaction programs which support varied display screens. The variations in the display screen layouts and differing available options can be confusing to customers when different terminals are used at many varied locations. The displayed terms used and available by the terminals for interacting with the customer are not consistent among all terminals due to the unique operating programs utilized by each system.

For example, only some systems may have a "Quick Cash" feature which retrieves a predetermined amount of cash from the customer's bank account. A customer is not guaranteed this option at every terminal. Also, when traveling abroad from a customer's home country, the language of the text displayed can make transactions difficult to complete. While some terminals support multiple languages (i.e., English and Spanish), not all languages are programmed into the terminal. Presently, the terminals have one pre-set form of interaction screen and sequence and do not allow the customer to choose his/her preferred interaction screen.

As the computer technology advances, more and more application programs for new functions and services are being created. The primary capability of depositing and withdrawing money from financial terminals is becoming just one of many functions that can be performed in a transaction. Applications such as automatic bill paying, catalog shopping, investment management all are in existence today and could soon be added to financial terminals. Unfortunately, each application requires its own executable code or routine to be stored within each terminal, creating a significant burden. Also, as the number of application routines increases, the size of the memory storage needed at the terminal increases. Moreover, a customer will be forced to go through a myriad of menu screens to get to the actual function he or she desires.

In addition, transaction programs that are stored in the financial terminals can be programmed in a number of different computer languages. Some of these languages include "Zontalk" for POS terminals, "C", 8051 assembly, and 286 assembly languages. Many terminals are only programmed in one language for the central transaction program and all application sub-programs. The terminal then compiles the software programs to make an executable file (a binary representation of the program created for machine execution) which controls the transaction. Each transaction program can be unique but must meet certain software specifications in order to properly read financial cards presented to the system. The transaction program for financial transactions has heretofore always been stored in the terminal.

Other terminals in addition to ATMs can be used at least in part as a financial transaction terminal with a financial transaction card. These include home personal computers, point-of-sale (POS) terminals, and pay phones which accept charge cards. All these terminals share the problem of the ATM of requiring all the software of the features to be terminal resident, resulting in part in a lack of continuity for the customer.

There are cards containing memory for storing data in the prior art. U.S. Pat. No. 5,157,247 issued to Takahira and entitled "IC Card" discloses a card with circuitry for transmitting and receiving data from an external source, a data memory for storing data, and a data processing CPU. Additionally, U.S. Pat. No. 5,225,667 issued to Furuta et al. and entitled "IC Card" discloses an IC card containing Random Access Memory (RAM). An International Application No. WO 91/16691 by Jones et al. and entitled "Value Transfer System" discloses a system where electronic purses keep individual accounts stored in IC cards. Each IC card then changes its balance based upon the price of an item purchased and can be replenished at banks. Jones et al. shows a benefit of storing data on the card.

The above referenced IC cards all describe storing data elements such as a balance, customer ID, etc. to interact with a terminal having a resident transaction program. The systems that utilize these cards are therefore subject to the disadvantages of terminal based operating systems that are described above.

SUMMARY OF THE INVENTION

Accordingly, it would be beneficial to allow the card user and/or card issuer to personalize the terminal displays and selection options based on his or her own preferences. These personalizations insure that the customer is familiar with the display screens, that the screens will be in the proper language for communication, and that the options available are only those desired by the card user or allowed by the card issuer. The customization also allows the financial institution that issued the financial card to assert greater control over the customer's financial behavior.

It would also be beneficial to have a financial card that contains instructions which carry out these personalized functions, such that all terminals would not have to be equipped with all applications desired by all issuing banks and all card holders; instead, the issuing bank and card holder would dictate the financial transactions available as options to the card holder.

To this end, there is provided a system and method for processing a customized financial transaction card. The system and method uses a financial card which stores the instructions corresponding to one or more financial transactions. These instructions are pre-selected, meaning that the issuing bank or card holder selects, prior to card use for a particular transaction, what options are available to the user. For instance, options such as cash withdrawal, bill payment, or product purchase, would be available to those users who pre-select those options prior to use of the card for one of those particular transactions. Instructions on the card will allow the user to conduct any one of the pre-selected transactions.

The system and method of the present invention further provides for terminals which are programmed to read the pre-selected instructions on the card, interpret those instructions and execute the interpreted instructions to conduct one or more of the financial transactions. Preferably, the terminals are initially made aware that the card contains transaction instructions which must be read by the terminal. The terminal reads and interprets the instructions on the card and—preferably based on a selection made by the user after viewing the displayed options available to the user (also dictated by the instructions on the card)—the terminal completes the transaction.

In this manner, a system and method is provided which overcomes the disadvantage of the prior art by eliminating the need to provide terminals with countless operating procedures and by enabling customized displays and options to the transaction card holder.

BRIEF DESCRIPTION OF THE DRAWINGS

Further objects, features and advantages of the invention will become apparent from the following detailed description taken in conjunction with the accompanying figures showing a preferred embodiment of the invention, on which:

FIGS. 6A–F illustrate portions of a sample transaction program written in the customized language and stored in the financial card of FIG. 4 wherein:

Figure 1:
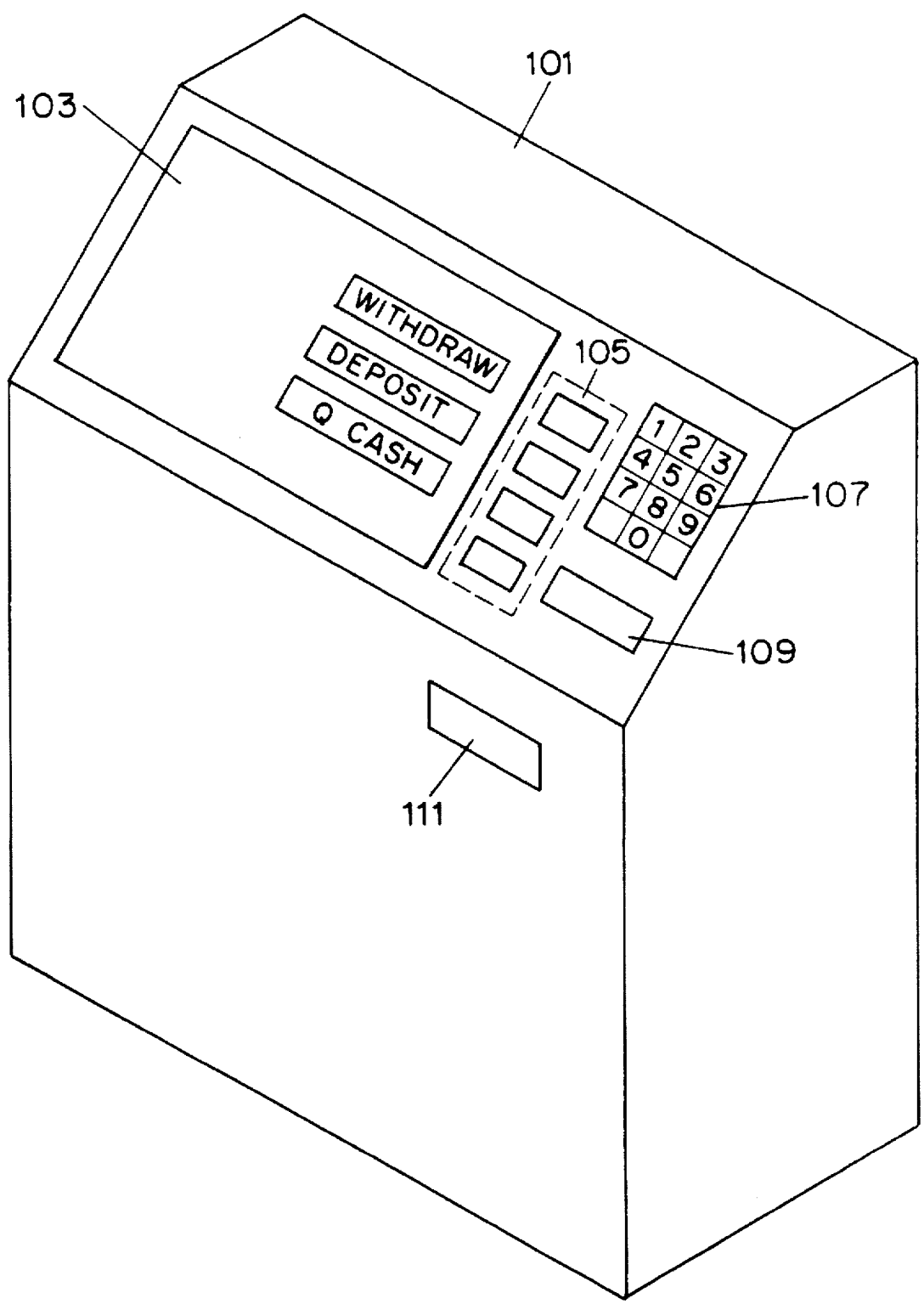
FIG. 1 illustrates a financial terminal in accordance with the invention.

6A illustrates the core program;

6B illustrates the "Quick Cash" subroutine;

6C illustrates the "Pay Mortgage Bill" subroutine;

6D illustrates the "Withdraw Other Amount" subroutine;

6E illustrates the "Return Card" subroutine; and 6F illustrates a function group.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION

FIG. 1 depicts the external portion of a financial transaction terminal 101 which can be used in a conventional manner. While the transaction terminal described is an ATM machine, the invention is not limited to this one type of terminal, but is inclusive of home computers, POS terminals, and pay telephones and other devices that accept financial cards. Any other type of terminal that accepts financial cards for processing is also included.

Terminal 101 comprises a display 103, selector buttons 105, key pad 107, card receptacle 109 and money receptacle 111. A transaction performed in a conventional manner using terminal 101 will now be described. When a financial transaction card is inserted into card receptacle 109 by a customer, display 103 is activated to display a menu of functions which can be selected by the customer. The customer then activates one of selection buttons 105 to choose a desired function. The customer can make further data entries as needed by pressing a number on key board 109 or be selecting further selection buttons 105. Cash can be deposited or withdrawn from a customer's account by placing or receiving money in money receptacle 111.

The images and menu features shown on display 103 varies by financial institution and actual terminal. While most ATM terminals have the basic operations of withdrawing and depositing money, other features can be included depending upon the actual terminal and system operating.

Figure 2:
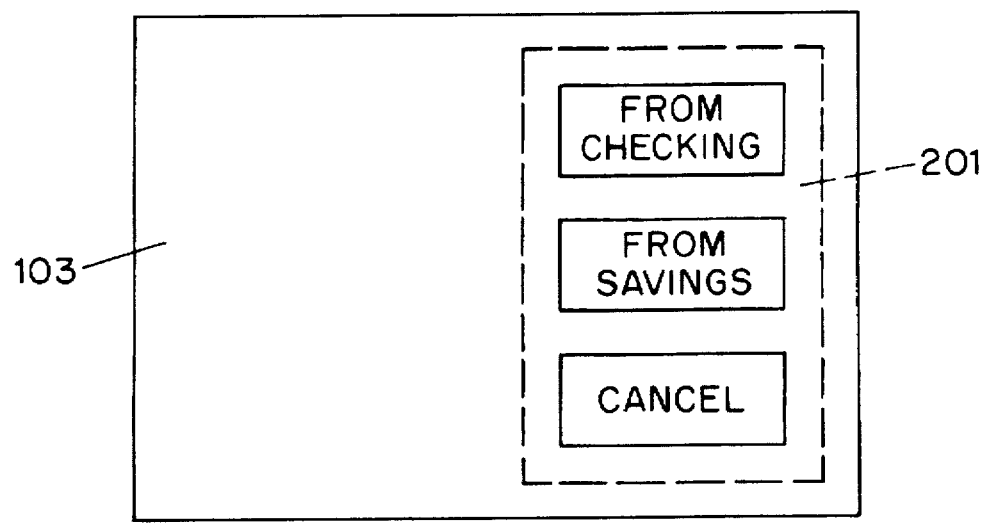
FIG. 2 illustrates a typical menu appearing on a display of the terminal in FIG. 1.

FIG. 2 depicts a menu screen which is an example of a screen a customer would encounter during a transaction when used in a conventional manner. This particular screen might appear after the function "Withdraw Cash" is chosen. FIG. 2 shows display 103 with function choices 201 displayed as "From Checking", "From Savings", or "Cancel". This is one window from a layered display menu that may be found in a terminal where the screen display is dependent upon the customer's last entry. The actual display will vary terminal by terminal and the word choice and available options will differ.

The sophistication of display will also vary by type of terminal. A home computer terminal with card reader will have a high resolution display while a pay-phone may have only a limited character display.

Figure 3:
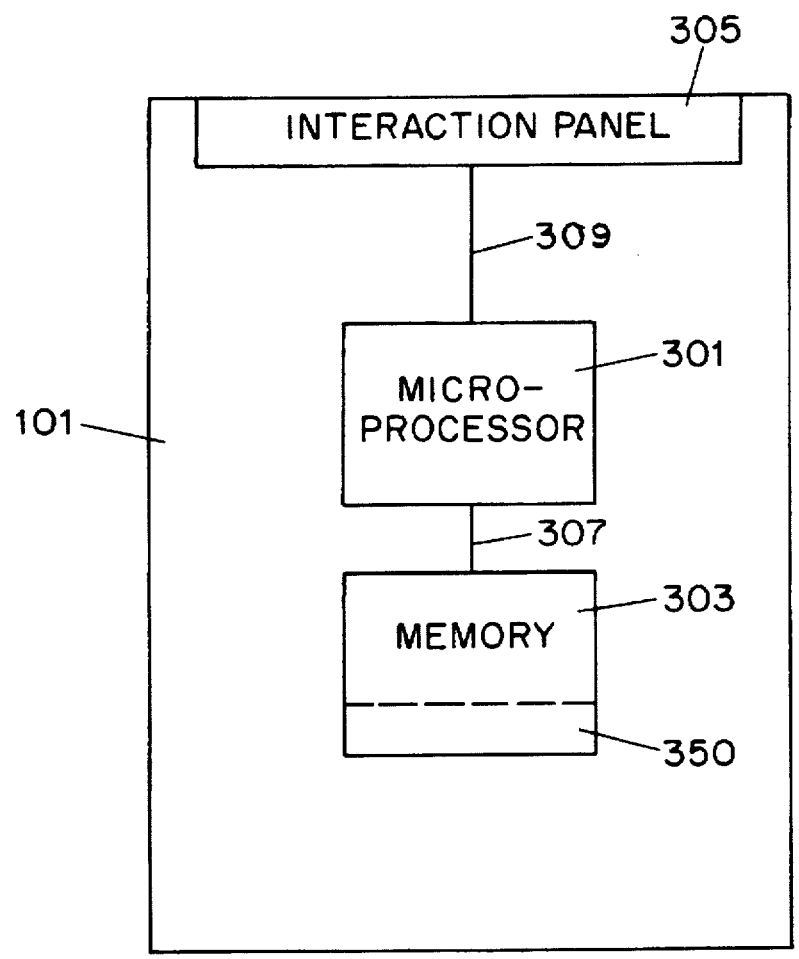
FIG. 3 illustrates the internal electronics of the terminal in FIG. 1.

FIG. 3 is a schematic diagram of the internal electronics present in the financial transaction terminal 101 in accordance with the present invention. Terminal 101 comprises a microprocessor 301, a memory 303 and interaction panel 305. The microprocessor is connected to a memory 303 via connector 307 which stores an operating system which orchestrates the operation of terminal 101. Memory 303 also stores a conventional interpreter to process the transaction instruction steps. Unlike the prior art, the instruction steps are stored in and read from a customized financial card, described below. The interpreter in the terminal translates the read instructions into machine code for use in execution of one or more financial transactions.

Microprocessor 301 is connected to interaction panel 305 via connectors 309. Interaction panel 305 comprises display 103 a display controller, function buttons 105, key pad 107 and receptacles 109 and 111. When a financial transaction is initiated by a customer in a conventional manner by placing his financial card into receptacle 109, the transaction program in the card is interpreted by the interpreter and executed by microprocessor 301 which in turn generates displays, retrieves data, performs calculations, and does other computing functions necessary for a successful and complete financial transaction. In this manner, unlike the prior art, the transaction instruction steps may differ for each card placed in the terminal.

Figure 4:
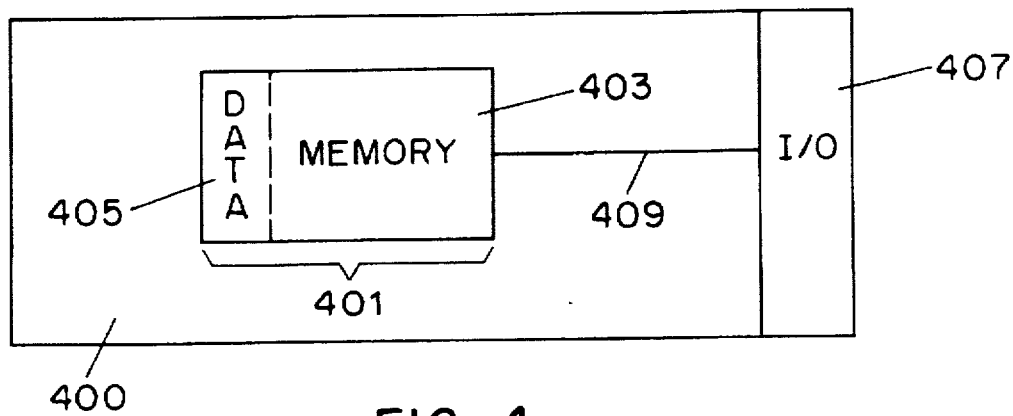
FIG. 4 illustrates a customized financial card storing a transaction program in accordance with this invention.

FIG. 4 illustrates a customized program card, in accordance with the invention, that is used with terminal 101. The customized program card comprises a memory 401, an Input/Output (I/O) port 407 and leads 409 to connect the I/O port 407 to memory 401. Memory 401 comprises a program memory space 403 and a data memory space 405. Program memory space 403 is used to store the programming instruction sets which are associated with, i.e., perform when interpreted and executed, one or more financial transactions. Routines may also be present to instruct the terminal regarding the options available to the user. These options are pre-selected by the user or card issuer, meaning that the instructions associated with these options are placed on the card prior to use for a particular financial transaction.

The contents of program memory 403 can be retrieved by an outside source or altered (updated, added to, or reduced) via the I/O port 407. This allows for modification of the financial transactions available to, or display features provided to, the user.

Data memory space 405 contains stored data necessary to complete a financial transaction. Stored data may include the card holder's name, account number, card expiration date, security code and preference indicators. The data may also include personalized spending limits set by the card issuing financial institution. Other categories of data may also be stored that can be used during a transaction. Card 400 can also include a microprocessor and be an integrated chip "IC" card that can perform its own processor operation such as a high level security check of the validity of the card.

In accordance with the invention, card 400 can be used as a combination bank card, credit card and/or debit card, and/or purse card or the like. The card 400 can contain sufficient instructions and data to support bank operations, credit card operations and other financial transactions. Card 400 can be used with a variety of terminal types.

A typical transaction using the techniques of the present invention will now be described. The card holder first places card 400 into the terminal receptacle 109 to begin a financial transaction. Terminal 101 then identifies card 400 as a customized programming card preferably by reading some initial data code stored in data memory 405 of card 400, which data is indicative of a card containing operating instructions to be read by the terminal.

Terminal 101 next preferably reads the programming steps from programming memory 403 into terminal memory 350. The programming steps reflect those pre-selected features desired by the customer. Alternatively, the terminal initially only reads those instructions necessarily to generate a display of a specialized message or the options available to the user. In this example, however, the terminal reads all of the instructions stored in memory 403.

The instruction steps read by the terminal are then processed, i.e., interpreted, by a terminal resident interpreter stored in terminal memory 303, to make the steps executable by the terminal. The terminal then executes the interpreted instructions to conduct one or more of the financial transactions.

Preferably, instructions from the card are read by the terminal which indicate the options available to the user. These options are displayed to the user who selects one of the financial transactions to be performed. The terminal preferably then reads and interprets the instructions associated with the selected option and executes the interpreted instructions to complete the selected transaction. After the transaction is complete, terminal 101 preferably automatically erases the customized program that was just run and resets for the next transaction.

Figure 5:
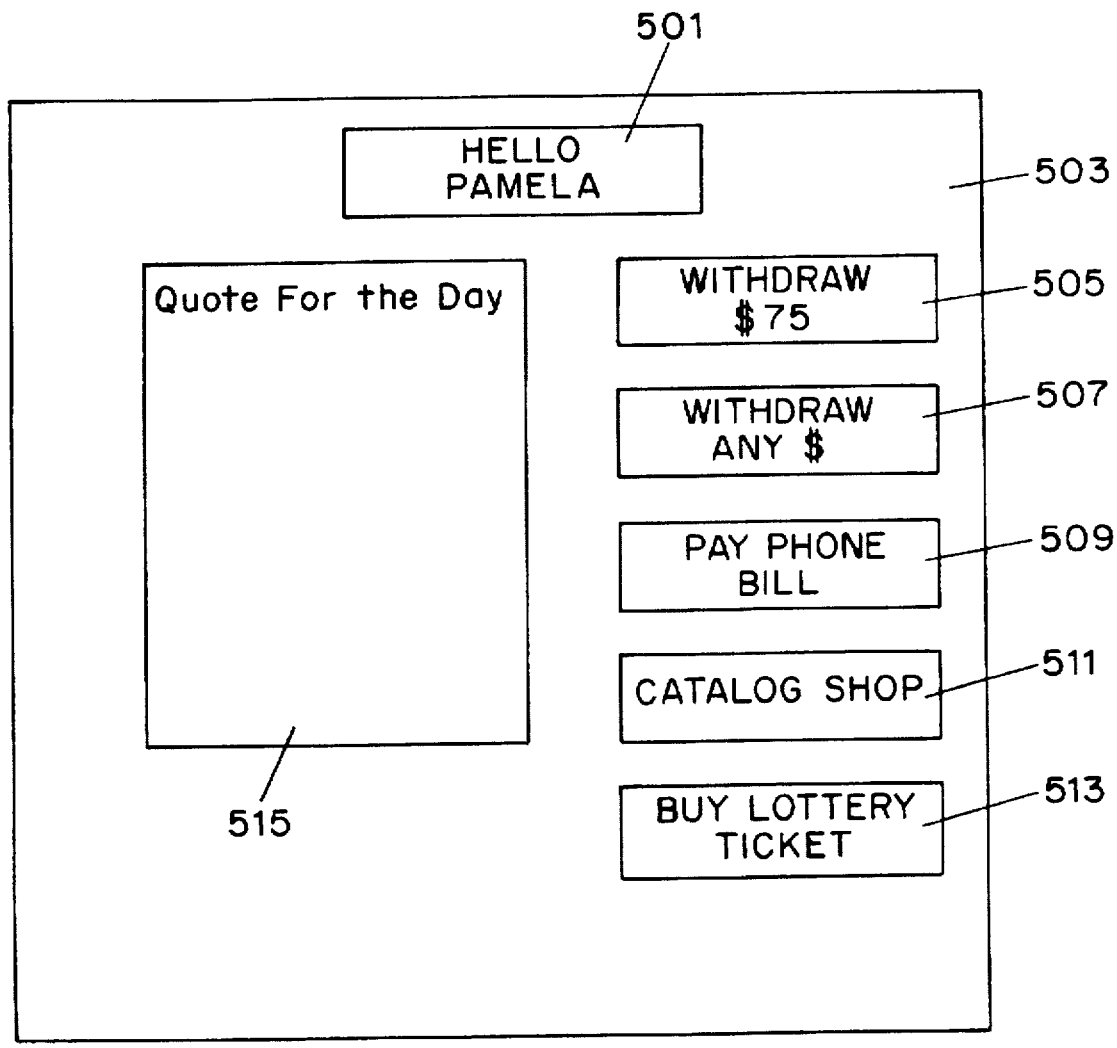
FIG. 5 illustrates a customized menu display generated from a transaction program and stored in the customized financial card of FIG. 4.

FIG. 5 depicts a customized display screen 503 using the present invention. The display screen shows text blocks identifying available functions that are personalized to the card user. The stored program on each customer's cards allows the display and interaction of every terminal performing a transaction to be customized to the needs of each individual customer. For example, text box 501 displays a welcome message by name to the card user. Text block 515 displays a pleasant picture or a quote for the day to make transactions more enjoyable to customers. These extra features can be available depending on the desires of the particular customer, and/or issuer. The actual features described are only examples of the vast potential of items displayed on the screen.

The function displays can be tailored to the desired choices of the customer by storing in the card only operating instructions for those functions chosen. A current popular function in financial transactions is the "Quick Cash" key which will retrieve a predetermined amount (e.g., $100) from the customer's checking account with the depression of a selected button. However, in the prior art, the predetermined amount is set by the program stored in the terminal and cannot be changed for each customer. While different amounts of memory for a particular withdrawal can be selected, it requires many additional key strokes and takes a longer time to complete the transaction. With the customized financial transaction card 400, the "Quick Cash" function can be set to any desired level, (e.g $20, $50 etc.), which would speed up transactions considerably if a customer normally retrieves the same amount each time, something that most customers do. In this particular instance, the user's desired "Quick Cash" function is $75 as reflected by function block 505.

Function block 507 is a normal "Withdraw Specified Amount" function which is a necessary feature in case the customer desires to withdraw a different amount than the predetermined "Quick Cash" amount. The present invention also allows the card issuing financial institution to limit withdrawal amounts of a customer depending on past credit history and risk, and perhaps requiring authorization by the bank if the requested withdrawal exceeds a certain limit. This is accomplished by storing the correct combination of instruction sets on the card.

Function key 509 is a bill paying function key. This function, while currently not available at most financial transaction terminals, could be added. The function key would allow a card holder to transfer a designated amount of funds to a service provider, i.e., a telephone company or mortgage lender, without writing a check. The amount could be for a current level of a bill such as a mortgage payment whose value would be stored in the data memory 405 of card 400. This function would be available to customers if they desired it. However, not every customer would want to have this option available. Some customers may prefer to pay their bills directly. The bill paying function is good example of a function that can be added for only those customers who desire it. If a customer wishes to have this option, his or her respective customized financial card 400 would be altered accordingly and contain the necessary instructions to be read, interpreted and executed.

Function 511 represents an option to order merchandise from catalogs while simultaneously transferring money from a customer's checking account to the catalog company. Pressing the button corresponding to catalog shopping function will bring up a new set of menu choices to complete the purchase. For example, terminal 101 can display only the preselected catalog companies previously chosen by the customer to make a purchase by storing the correct programming steps and corresponding data in card 400. This would allow only the customer's favorite catalogs to appear on the screen. Catalog ordering is another function that would be desired by some customers and not by others. If the function is preferred, the corresponding programming instructions will be added to the operating code stored in the customized financial card 400 of each user.

Other potential functions include buying lottery tickets 513. This is one more example of the many possible functions that can be stored as part of the customized program on each card user's card. By allowing the customer to customize the transaction menus to his preferences, the financial transactions become much more efficient and user friendly thus increasing the use of the cards 400.

Specialized functions by financial institution or vendor are well suited to be used with this invention. Bonus programs for financial transactions such as frequent flyer, frequent purchaser, or rebate programs are only used by customers who desire to be part of the programs. The corresponding instruction steps for each program need only be stored on the participants card 400, and not resident on all transaction terminals.

Some functions will be limited to a certain type of terminal for a particular transaction. A "Withdraw Cash" function cannot be performed at a pay telephone. The interpreter programs stored in each terminal will only allow the functions which can be run on its particular terminal to be executed. Alternatively, the terminal will only retrieve usable instruction steps from card 400 that are capable of being performed.

Preferred functions can be added to each customer's customized financial card 400 easily. Special terminals can be located at central locations such as bank branches that will have the ability to transmit instruction sets for a particular function to each financial card 400. The instruction sets can be designed as subroutines which can be called from a main program when that particular function is selected.

Moreover, these specialized terminals can also remove functions when a customer and/or issuer no longer desires the particular function. This can be accomplished by removing the corresponding instruction set or by simply disabling the operating program from executing that subroutine. Alternatively, the financial institution issuing financial card 400 can issue a new card with the correct operating instructions present to match the customer's desired features. An initial questionnaire can be filled out by a new customer to select his designated features. A card can be equipped with proper routines corresponding to the selected functions.

Figure 6A:
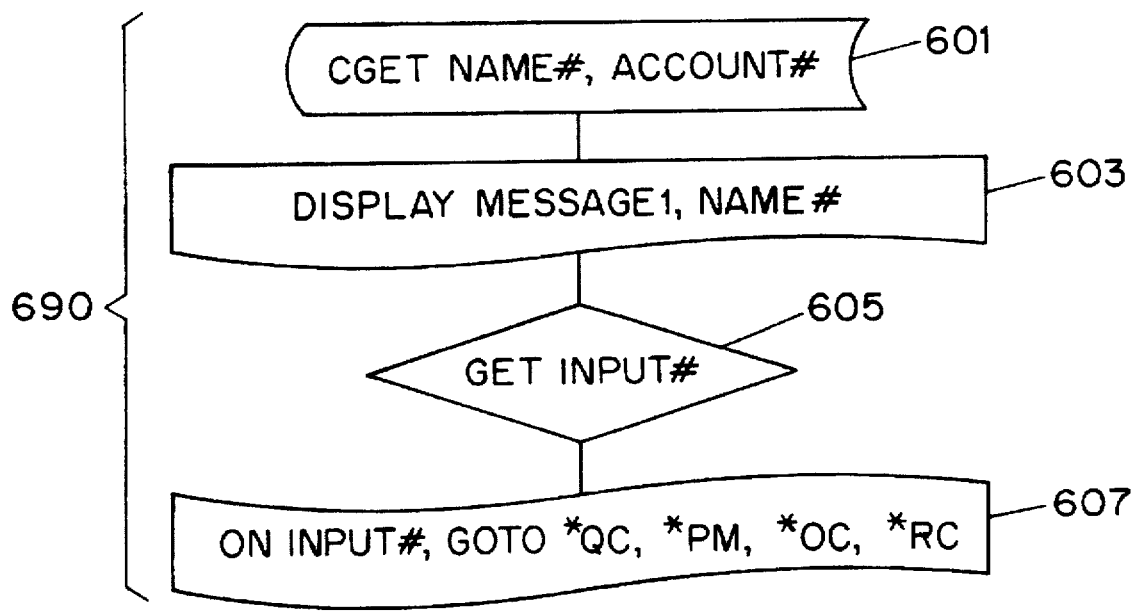
Figure 6B:
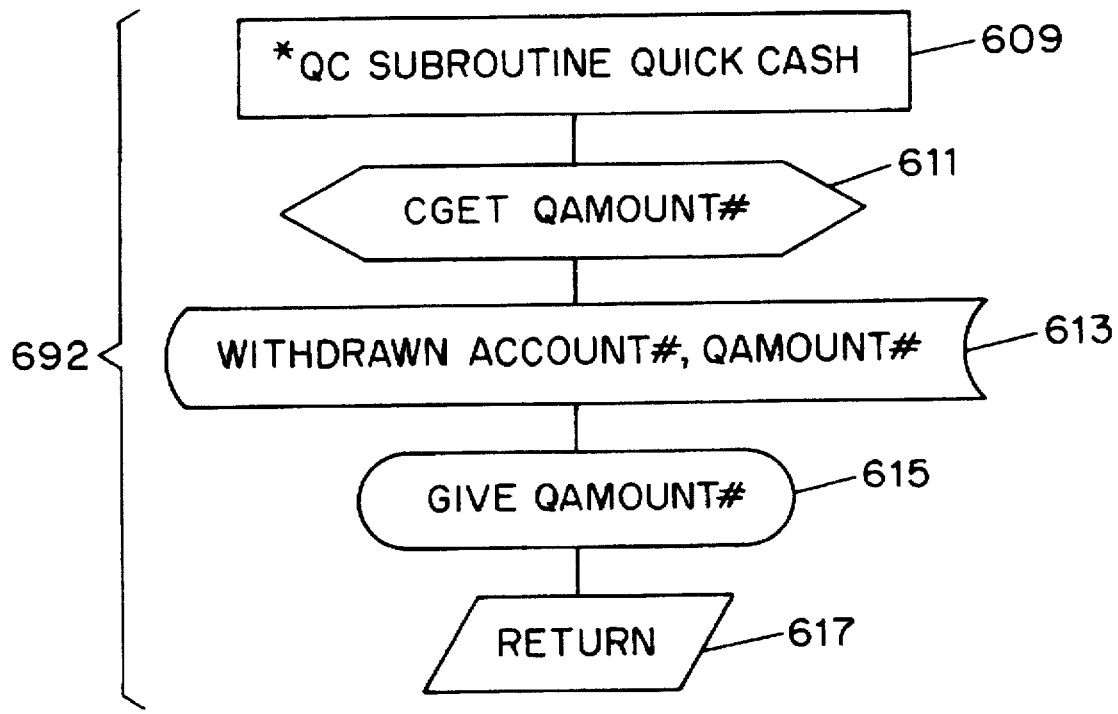
Figure 6C:
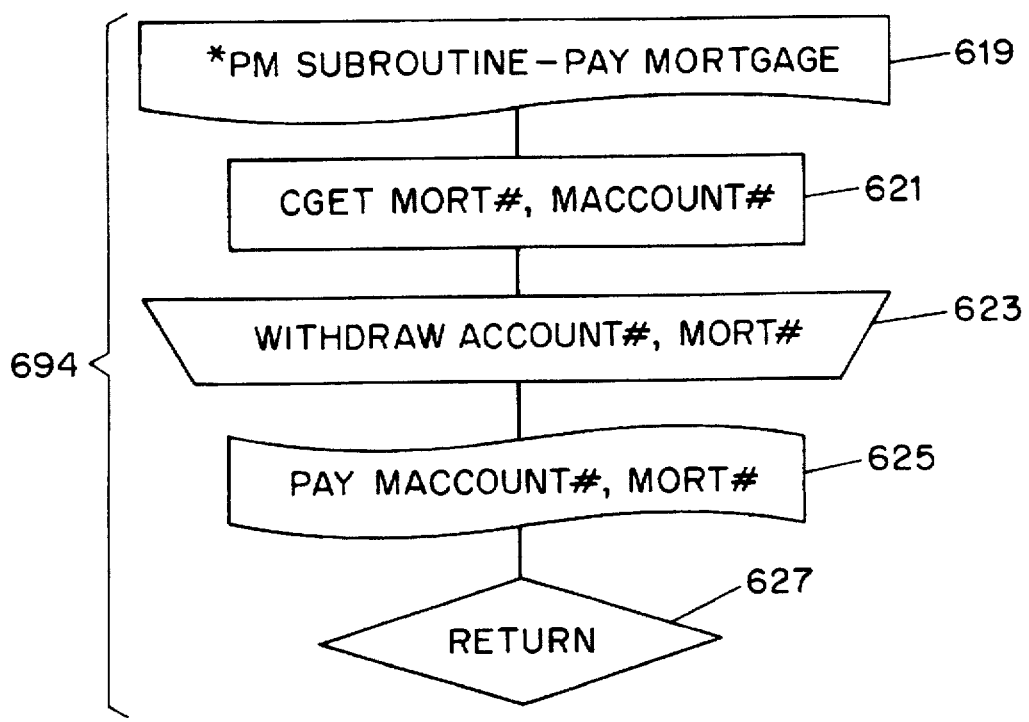
Figure 6D:
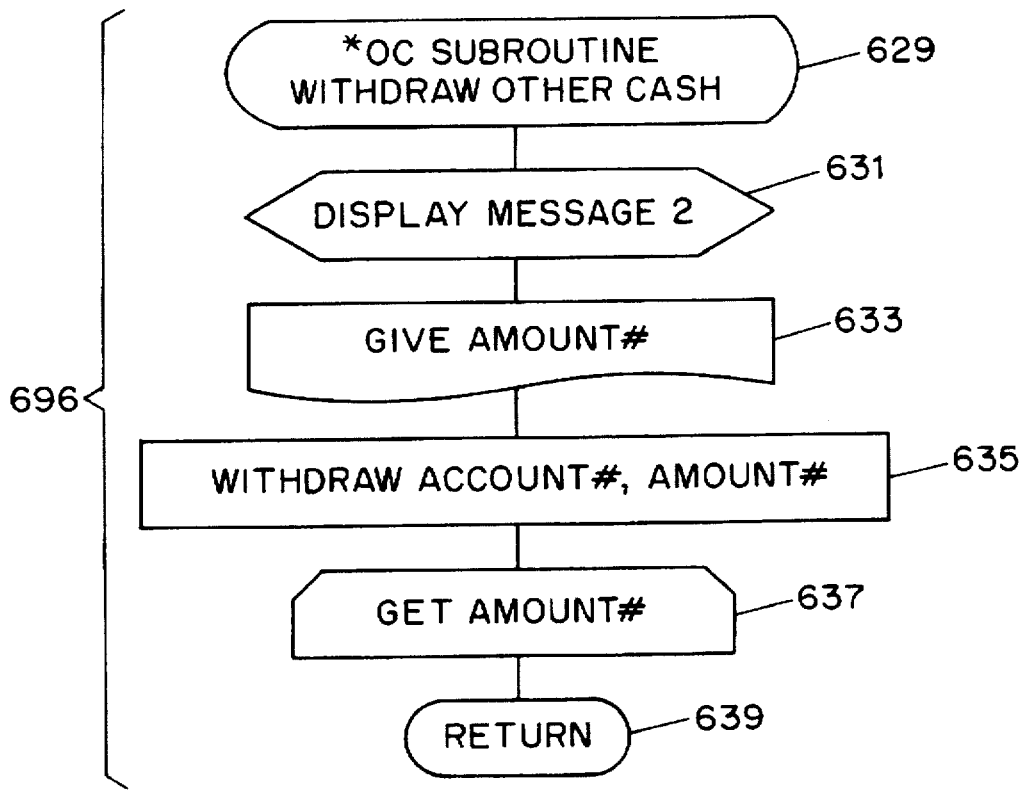
Figure 6E:
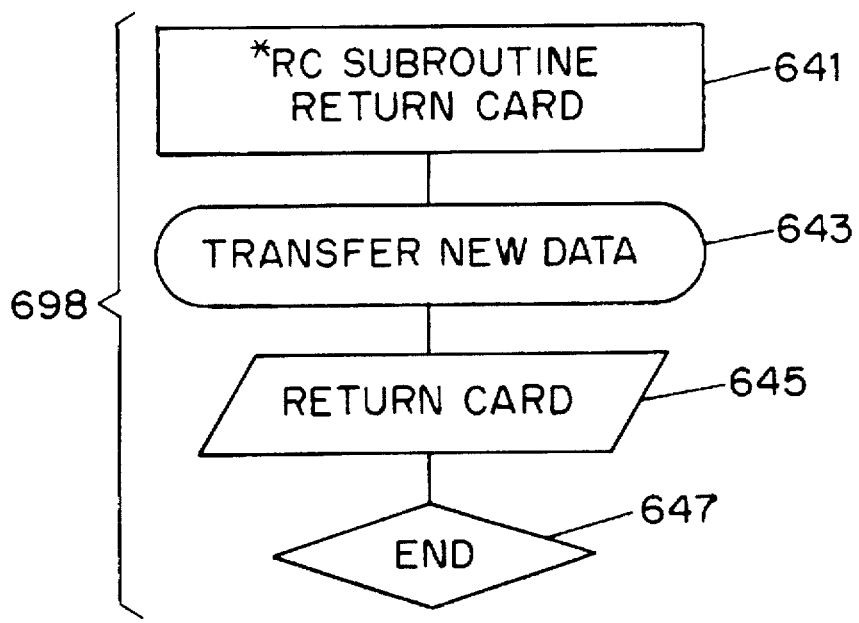

FIGS. 6A-F are an example of the structure of the transaction program comprised of programming instructions which is stored in memory 403 of customized financial card 400. The program which serves as an example consists structurally of a core program 690 (FIG. 6A) and four subroutines 692 (FIG. 6B), 694 (FIG. 6C), 696 (FIG. 6D) and 698 (FIG. 6E). Also part of the program set is group 699 (FIG. 6F) which contains instructions used for customizing the display menus.

The construction of a typical transaction program of the present invention to be stored in card 400 and executed on terminal 101 after card 400 is inserted into terminal 101 will now be described. The instruction set shown is written for an ATM terminal, and the instructions would be altered according to the limitations of the actual terminal used, e.g. less sophisticated for pay phones. The example instructions show the unique level of interaction between the card 400 and terminal 101 controlled by the contents of the card's memory 403.

The core program 690 shown in FIG. 6A includes a set of instructions to retrieve customer related data stored in card 400, display the available optional transaction functions to the customer, accept the customer's selection of a desired function, and finally execute the proper subroutine containing further instructions corresponding to the customer's selection. For the example shown, instruction 601 retrieves data representing the customer's name and account number from the memory of card 400 and places the data temporarily in the terminal memory. The command "CGET" retrieves specified data from customized financial card 400. Instruction 603 displays a predefined message welcoming the customer and displays his transaction options. The predefined message can either be stored in card 400 or in terminal 101. The data element called "name#" retrieved from card 400 is displayed as part of the message. The command "Display message 1" also retrieves from group 699 stored in memory space 403 the titles of the functions which have been pre-selected by the customer causing corresponding instructions for those functions to be stored in card 400. If a new function not previously stored on card 400 is desired by a customer and then added to card 400 by storing an additional set of instructions for that function, then the corresponding function titles are also added to group 699 stored in card 400. This enables the available selected functions chosen by the individual customer to be displayed by terminal 101 after the card 400 is inserted into terminal 101.

Next, instruction 605 retrieves input data from terminal 101 which corresponds to the selection made by the customer by pressing one of function keys 105 on terminal 101. Instruction 607 then executes the interpreted instructions in the selected subroutine which corresponds to the customer's selection. For example, if the customer pressed the top button on the display of terminal 101, the subroutine corresponding to that function would be executed; if the customer chose a different button corresponding to another selection, the corresponding subroutine would be executed, etc. When a new function is added to the operating program stored in customer's card 400, the name of the subroutine is added to instruction 607 along with the new instruction set for that subroutine so that the new subroutine to be executed.

Subroutine 692 shown in FIG. 6B contains instructions to implement the "Quick Cash" function. Instruction 609 is a title instruction identifying the memory location of the "Quick Cash" subroutine. Instruction 611 retrieves data stored in card 400 indicating the amount the customer desires to receive when selecting "Quick Cash". The stored data is previously designated by the customer and is customized for each customer. The amount, designated by the variable "Qamount#", can be changed by the customer at terminal 101 if an additional feature of "change Quick cash amount" (instruction set not shown) is selected. That function would rewrite the actual data corresponding the Qamount value stored in customer's card 400. The data element Qamount# being stored in the customer's card 400 allows the customer to designate the same Quick cash value for all his transactions, whether that amount be $10, $50 or $100. Current financial terminals do not allow that flexibility.

Instruction 613 electronically withdraws the money from the customer's account by communicating the transaction with the customer's bank or a clearing house. The "Withdraw" command uses retrieve data variables account# and Qamount# to complete the instruction. Instruction 615 instructs terminal 101 to physically give funds in the amount designated by "Qamount#" from terminal 101 to the customer. Finally, instruction 639 returns the execution of the program to core routine 690.

Subroutine 694 shown in FIG. 6C contains instructions to implement the "Pay Mortgage Bill" function when selected. Instruction 619 is the title instruction identifying the memory location of the "Pay Mortgage Bill" subroutine. Instruction 621 retrieves data stored on card 400 corresponding to the customer's mortgage identification number and his/her mortgage payment amount. Instruction 623 electronically withdraws the mortgage payment amount from an account identified by the already retrieved customer's account number. Instruction 625 electronically transfers funds in the amount of the mortgage payment variable to the proper lender account identified with the customer's mortgage identification number. These data variables are stored on the customer's financial card 400. This allows the customer to pay the monthly mortgage payment with one touch of a button. Instruction 627 then returns the execution of the program to core program 690. The combination of stored data variables and the selected operating instructions on card 400 allows for a transaction to take place that is uniquely tailored for each identified customer.

Subroutine 696 shown in FIG. 6D contains instruction statements to implement the "Withdraw Other Amount" function. Instruction 629 is a title instruction identifying the memory location of the "Withdraw Other Amount" subroutine. Instruction 631 displays a second pre-constructed message stored in either card 400 or terminal 101 to display to the customer who initiated the translation that a desired amount of withdrawal must be chosen. Instruction 633 accepts the consumer's selection which is made by punching keys from keypad 107 and further stores the selected amount in the variable "amount#" in terminal 101. An example of a value stored in amount# is $35.00. Instruction 635 withdraws funds of the value stored in amount# from the customer's account designated by the retrieved variable account#. Instruction 637 then directs terminal 101 to physically give cash equal to the value stored in amount# to the customer. Instruction 639 then returns the execution of the transaction program to core program 690 because the execution of the "Withdraw Other Amount" function is complete.

Subroutine 698 shown in FIG. 6E contains instructions to implement the "Return card" function. This subroutine is executed at the end of the financial transaction when terminal 101 is directed to return the customer's financial card 400. Instruction 641 is a title instruction identifying the memory location of the "Return card" subroutine. Instruction 631 transfers data that has been altered during the transaction from terminal 101 to card 400 that has not been previously updated in card 400. This updated data can include transaction identification information, new preferred customer information or other variables. It allows the data stored in card 400 to reflect the customer's most recent preferences. Instruction 645 directs terminal 101 to eject the customer's card 400 because the transaction is complete. Instruction 647 is an "End" instruction and directs the terminal to reset and wait for the next customer. The terminal then removes the transaction instructions from its temporary memory which had been copied from card 400. This creates space in memory for the next transaction program corresponding to the next customer's financial card 400.

Figure 6F:
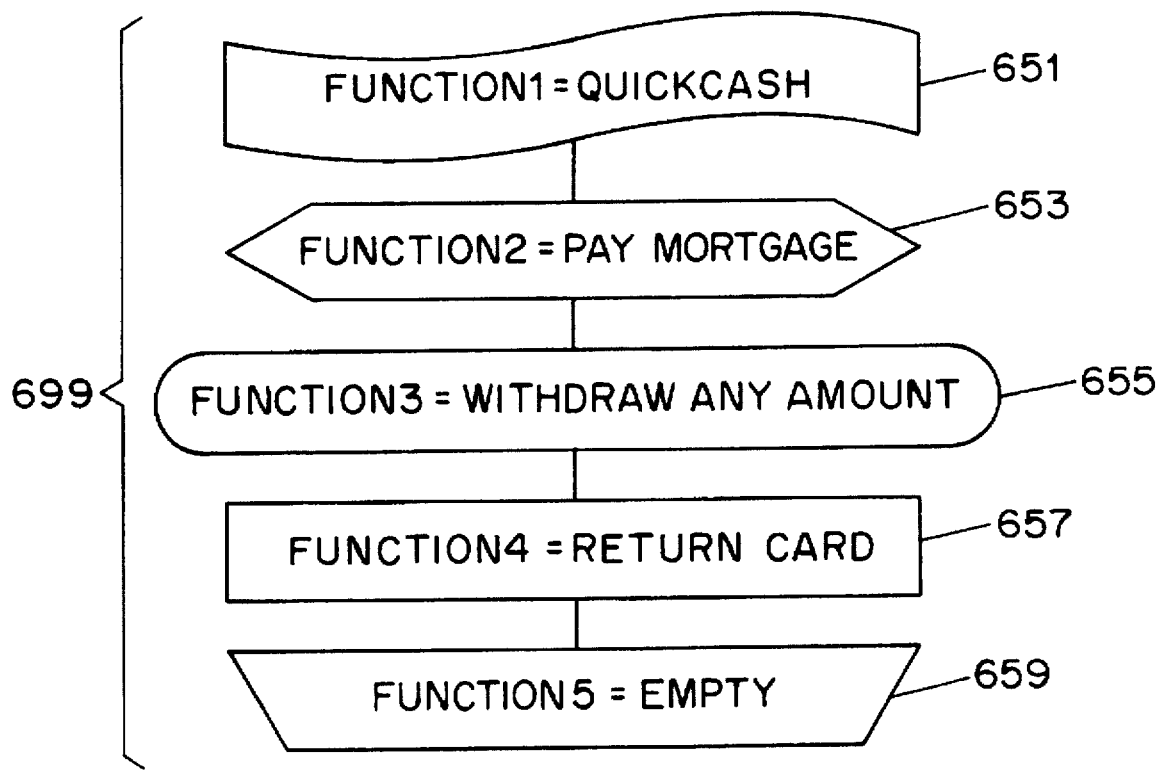

Group 699 shown in FIG. 6F is a group of elements which store the titles of the available functions that have been selected by the customer to be in his or her repertoire of possible transactions. The block can be easily altered and updated depending on the selections of functions for each particular customer. Element 651 is the name of the function "Quick Cash". Element 653 contains the name of the function "Pay Mortgage Bill". Element 655 contains the name of the function "Withdraw Other Amount". Element 657 contains the name of the function "Return Card". Element 659 is shown without characters but can be assigned a function title if the customer adds a new function to his card 400.

The instruction set illustrated in FIG. 6 does not limit the invention to only using those instructions. The instructions shown are simply illustrative of the type of commands that instruct terminal operation. Moreover, terminal 101 could execute each individual instruction stored in memory space 403 one at a time instead of reading the entire program into a memory buffer in terminal 101. This may provide an advantage in execution time and save terminal memory space depending on the amount of instructions that must be executed.

In addition, the operating instruction set could be transferred from card 400 to terminal 101 in a different mode than inserting the card 400 into the terminal. Card 400 could be scanned without physical contact to terminal 101 to transmit information. Card memory 401 could also comprise a magnetic strip capable of storing a large quantity of code and/or data.

The foregoing merely illustrates the principles of the invention. It will thus be appreciated that those skilled in the art will be able to devise numerous systems and methods which, although not explicitly shown or described herein, embody the principles of the invention and are thus fall within the spirit and scope of the invention, as claimed below.

I claim:

1. A method of conducting financial transactions with a financial card which includes a memory, comprising the steps of:

selecting at least one program function represented by program instructions;

selecting personalized data in response to said at least one selected function;

storing said selected program instructions and said data in said memory of said card;

transferring at least one of said program instructions to a terminal for processing;

interpreting said transferred program instructions in said terminal to produce executable code; and executing said executable code which accesses said personalized data during said execution.

2. The method of claim 1, wherein each of said program instructions in said memory can be individually modified.

3. The method of claim 1, further including the step of modifying at least one said program instruction stored in said memory.

4. The method of claim 1, wherein said interpreting and executing steps are performable in each of a plurality of terminals.

5. The method of claim 1, further including the step of displaying representations of said at least one selected function on said terminal's display.

6. The method of claim 5, further including the step of selecting during a transaction at least one of said displayed representations and wherein said transferred program instructions are representative of said selected displayed representations.

7. A method for customizing a financial transaction of a financial card user, wherein said card comprises a memory, comprising:

obtaining information regarding said card user;

selecting transaction functions responsive to said information;

storing program instructions implementing said selected functions in said memory of said card; and storing personalized data responsive to said information in said memory of said card;

wherein said provided program instructions are transferred to a terminal, interpreted and executed to complete a transaction implementing at least one of said selected functions accessing said personalized data.

8. The method of claim 7, further including the step of modifying at least one program instruction stored in said memory.

9. The method of claim 7, further including the step of modifying said data stored in said memory.

10. The method of claim 7, further including the step of displaying representations of said selected functions on said terminal's display during a transaction.

11. The method of claim 10, wherein said displaying step displays representations of only said selected functions during said transaction.

12. The method of claim 10, further including the step of selecting at least one of said displayed representations and wherein said transferred program instructions are responsive to said selected displayed representations.

13. The method of claim 7, wherein said personalized data is transferred to said terminal with said program instructions.

14. A financial card system for conducting financial transactions comprising:

at least one financial card customized to a card user by storing selected program instructions indicative of at least one selected function and storing data selected in response to said selected functions; and at least one terminal for receiving said selected program instructions and said selected data and producing a display customized to said card user comprising representation of said selected functions responsive to said received program instructions and data.

15. The financial card system of claim 14, wherein said at least one terminal interprets said selected program instructions to produce executable code which generates said customized display.

16. The financial card system of claim 15, wherein said at least one terminal executes said executable code and performs said transactions.

17. The financial card system of claim 14, wherein said at least one terminal further includes means for selecting at least one of said functions during a transaction, wherein said function performed is said function selected during the transaction.

18. The financial card system of claim 14, wherein said selected data is selected by a user of said card.

19. The financial card system of claim. 14, wherein said selected data is selected by an issuer of said card.

20. The financial card system of claim 14, wherein said at least one terminal further includes storage means for temporarily storing one or more of said selected program instructions.

21. The financial card system of claim 14, wherein said system further comprises means for modifying said program instructions on said financial card.

22. The financial card system of claim 14, wherein said system further comprises means for modifying said data on said financial card.

* * * * *